(12) United States Patent
Ichikawa

(10) Patent No.: US 7,072,648 B2
(45) Date of Patent: Jul. 4, 2006

(54) FAULT MONITORING METHOD FOR COMMODITY MANAGEMENT RADIO COMMUNICATING APPARATUS, STORAGE MEDIUM FOR STORING FAULT MONITORING PROGRAM FOR COMMODITY MANAGEMENT RADIO APPARATUS AND FAULT MONITORING PROGRAM

(75) Inventor: Yoshiaki Ichikawa, Tokyo (JP)

(73) Assignee: NEC Infrontia Corporation, Tokyo (JP)

( * ) Notice: Subject to any disclaimer, the term of this patent is extended or adjusted under 35 U.S.C. 154(b) by 914 days.

(21) Appl. No.: 09/750,793

(22) Filed: Jan. 2, 2001

(65) Prior Publication Data

US 2001/0007818 A1 Jul. 12, 2001

(30) Foreign Application Priority Data

Jan. 6, 2000 (JP) ......................... 2000-001114

(51) Int. Cl.
*H04Q 7/20* (2006.01)

(52) U.S. Cl. ..................... 455/425; 455/67.1; 455/423; 455/561

(58) Field of Classification Search ................. 455/425, 455/67.11, 423, 561, 26.1, 67.14, 9, 7.11, 455/340, 84, 560, 405; 340/989, 626, 992; 701/424; 709/5
See application file for complete search history.

(56) References Cited

U.S. PATENT DOCUMENTS

| | | | | |
|---|---|---|---|---|
| 4,622,438 A | * | 11/1986 | Shimizu et al. ............. | 455/425 |
| 5,201,063 A | * | 4/1993 | Tam et al. ................ | 455/67.11 |
| 5,686,888 A | * | 11/1997 | Welles et al. ........... | 340/539.13 |
| 5,691,980 A | * | 11/1997 | Welles et al. ............... | 370/316 |
| 5,717,889 A | * | 2/1998 | Rettig ......................... | 370/447 |
| 5,742,238 A | * | 4/1998 | Fox ........................ | 340/825.49 |
| 5,752,165 A | * | 5/1998 | Hokkanen ................ | 455/67.11 |
| 5,917,433 A | * | 6/1999 | Keillor et al. .............. | 340/989 |
| 6,070,091 A | * | 5/2000 | Hogevik ..................... | 455/561 |
| 6,169,883 B1 | * | 1/2001 | Vimpari et al. .......... | 455/67.11 |
| 6,215,997 B1 | * | 4/2001 | Han ........................... | 455/423 |
| 6,223,032 B1 | * | 4/2001 | Cuffaro ...................... | 455/425 |
| 6,389,281 B1 | * | 5/2002 | Lee ............................ | 455/423 |
| 6,402,691 B1 | * | 6/2002 | Peddicord et al. .......... | 600/300 |

FOREIGN PATENT DOCUMENTS

| | | |
|---|---|---|
| JP | 5-268225 | 10/1993 |
| JP | 9-23284 | 1/1997 |
| JP | 10-126320 | 5/1998 |

OTHER PUBLICATIONS

Japanese Patent Office Office Action issued on Apr. 2, 2002 with English translation of relevant parts.

* cited by examiner

*Primary Examiner*—Jean Gelin
*Assistant Examiner*—Julio Perez
(74) *Attorney, Agent, or Firm*—Whitham, Curtis, Christofferson & Cook P.C.

(57) ABSTRACT

In a fault monitoring method for a portable radio communication terminal, plural portable radio communication terminals communicate with an inventory controller via a radio communication base station. In the portable radio communication terminal in a commodity management system, when the number of retrying times of radio communication between the portable radio communication terminal and the radio communication base station exceeds a predetermined number of times, the portable radio communication terminal automatically executes a test of a radio communication section and displays a fault on a display section of the portable radio communication terminal when a fault occurs.

8 Claims, 3 Drawing Sheets

FAULT MONITORING METHOD FOR COMMODITY MANAGEMENT RADIO COMMUNICATING APPARATUS, STORAGE MEDIUM FOR STORING FAULT MONITORING PROGRAM FOR COMMODITY MANAGEMENT RADIO APPARATUS AND FAULT MONITORING PROGRAM

BACKGROUND OF THE INVENTION

1. Field of the Invention

The present invention relates to a fault monitoring method for a commodity management radio communicating apparatus, a storage medium for string a fault monitoring program and the fault monitoring program for automatically displaying a fault in a radio communication section in a portable radio communication terminal used for the commodity management radio communicating apparatus.

The present application claims priority of Japanese Patent Application No. 2000-001114 filed on Jan. 6, 2000, which is hereby incorporated by reference.

2. Description of the Related Art

In a commodity management radio communicating system used in a convenience store or a like, a radio communication base station is connected to an inventory controller connected to a plurality of POS (Point Of Sale) terminals, radio communication signals are received and transmitted from a plurality of radio communication terminals held by monitoring persons of the radio communication base station to communicate information such as kinds and number of commodities. With this system, the inventory controller is capable of executing processes such as commodity inventory management, inventory-counting and item-checking.

FIG. 3 shows a general configuration of the commodity management radio communicating system. An inventory controller 1 is connected with a plurality of POS terminals 2 and is connected with a radio communication base station 3. The radio communication base station is provided with an antenna. Also, the inventory controller 1 radio-communicates with a plurality of portable radio communication terminals 4. Further, the inventory controller 1 controls a printer 5 to print out process results such as commodity inventory management, inventory-counting and item-checking and receives and transmits various information from/to a central host machine (not shown) via a line 6.

FIG. 4 is an example of the conventional portable radio communication terminal 4. The portable radio communication terminal 4 is mainly provided with a radio communication section 11, a control section 12, a CPU (Central Processing Unit) 13, a memory section 14 and a battery 15. Also, the control section 12 is provided with a key switch 12A and a display section 12B.

The radio communication section 11 receives and transmits radio communication signals from/to the radio communication base station 3 via the antenna. The control section 12 receives a control signal from the radio communication base station 3 via the radio communication section 11 and transmits various data and a control signal to the radio communication base station 3 via the antenna. The key switch 12A is provided with a plurality of keys such as numerals, alphabet characters and various symbols and used to input various data such as kinds, a number and a distinction of stocking or going out concerning commodities to the control section 12. The display 12B displays data for display output from the control section 12 using characters, numerals, symbols or a like. The CPU 13 controls receiving-transmission of radio communication signals in the radio communication section 11 and executes processes such as generating of various data in the control section 12 using a program and data stored in the memory section 14. The memory section 14 stores programs basically needed to operate the CPU 13, namely, OS (Operating System), and various application programs. The battery 15 supplies power needed to operate each section in the portable radio communication terminal 4.

Next, explanations will be given of an operation of the conventional commodity management radio communicating apparatus with reference to FIG. 3 and FIG. 4.

A specific portable radio communication terminal 4 receives a control signal in the radio communication channel from the radio communication base station 3, executes an operation (carrier sense) for checking whether a carrier wave from another portable radio communication terminal 4 is transmitted or not, and recognizes that no portable radio communication terminal 4 radio-communicates. Then, the specific portable radio communication terminal 4 establishes a communication procedure (protocol) of a radio communicating line and then transmits data to the radio communication base station 3.

The radio communication base station 3 functions as a bridge apparatus, analyzes received data from the inventory controller 1 and transmits data in accordance with a radio communication protocol suitable to the portable radio communication terminal 4. Also, received data from the portable radio communication terminal 4 is transmitted to the inventory controller 1 in inverse order.

The inventory controller 1 is a controlling apparatus including a keyboard, a display section and a memorizing section (not shown) and is connected to the central host machine (not shown) via the line 6. The inventory controller 1 receives emails and data from the central host machine, transmits sales data obtained from the POS terminals 2 to the central host machine, transmits price data to the POS terminals 2, manages working hours of employees and executes other functions or a like. The printer 5 is connected to the inventory controller 1 and used to print out emails, working daily reports of employees.

As described above, in the commodity management radio communicating system, the inventory controller 1 and the portable radio communication terminals are connected by radio communication lines via the radio communication base station 3, it is possible to inquire about inventory and to execute processes such as inventory counting via the portable radio communication terminal 4 though a monitoring person is not present at any place in a store.

Then, in the portable radio communication terminal 4, when a radio communication error occurs or a problem occurs in that it takes a longer time for a process than usual or like, a maintenance person can judge whether there is a fault in the portable radio communication terminal 4 or not by carrying out a radio communication test. For an example of the radio communication test, a test program is loaded into a specific portable radio communication terminal 4 having a problem and the specific portable radio communication terminal 4 is placed in a test mode, and then a radio loop-back test for the radio communication test of the specific portable radio communication terminal 4 is started. In accordance with results of the radio loop back test, it is judged whether the portable radio communication terminal 4 has the fault or not.

However, in a conventional fault monitoring method for the commodity management radio communicating apparatus, there is a problem in that a user can not carry out the radio communication test by oneself and only the maintenance person can carry out operations in order to move the radio communication base station into test mode, for example, by removing an apparatus case in the radio communication base station and by turning ON power while pushing a test mode switch or by removing an interface cable and then turning ON power.

Also, in the conventional fault monitoring method for the commodity management radio communicating apparatus, there is another problem in that the radio communication test can not be carried out while the commodity management system operates.

It happens because application software in the portable radio communication terminal is not configured so as to be capable of carrying out the radio communication test while operating and an interception is given to the radio communication in operating though the application software is merely modified so as to carry out the radio communication test.

SUMMARY OF THE INVENTION

In view of the above, it is an object of the present invention to provide a fault monitoring method of a commodity management radio communicating apparatus and a storage medium for storing a fault monitoring program of the commodity management radio communicating apparatus in which a user of a portable radio communication terminal can check a fault of a radio communication section in the portable radio communication terminal without help of a maintenance person by oneself in operation of a commodity management radio communicating system when a problem occurs in the portable radio communication terminal of the commodity management radio communicating apparatus.

According to a first aspect of the present invention, there is provided a fault monitoring method of a commodity management radio communicating apparatus in which plural portable radio communication terminals in a commodity management system manage commodities by communicating with an inventory controller via a radio communication base station, the fault monitoring method including:

a step of automatically executing a test of a radio communication section in the portable radio communication terminal when a number of retrying times of radio communication between the portable radio communication terminal and the radio communication base station exceeds a predetermined number of times; and a step of displaying a fault of the radio communication section on a display section of the portable radio communication terminal when the fault occurs.

In the foregoing, a preferable mode is one wherein a call time interval of retrying the radio communication between the portable radio communication terminal and the radio communication base station is set longer than an average communication time of the radio communication between the portable radio communication terminal and the radio communication base station in the commodity management system.

Also, a preferable mode is one wherein the test for the radio communication section is executed after checking that the radio communication between each portable radio communication terminal and the radio communication base station is vacant continuously in a case out of an execution prohibiting time zone in the commodity management system.

Also, a preferable mode is one wherein the test for the radio communication section is executed after passing a predetermined time by returning to a check of a vacant state in a case out of the execution prohibiting time zone in the commodity management system when the radio communication between each portable radio communication terminal and the radio communication base station and is waited for until the vacant state.

Furthermore, a preferable mode is one wherein the test for the radio communication section is executed after passing a predetermined time by returning to a check of the execution prohibiting time zone of the test in a case in the execution prohibiting time zone in the commodity management system and is waited for until out of the execution prohibiting time zone.

According to a second aspect of the present invention, there is provided a storage medium storing a fault monitoring program to cause a computer to carry out a fault monitoring method of a commodity management radio communicating apparatus in which plural portable radio communication terminals in a commodity management system manage commodities by communicating with an inventory controller via a radio communication base station, the fault monitoring program including:

a step of automatically executing a test of a radio communication section in the portable radio communication terminal when a number of retrying times of radio communication between the portable radio communication terminal and the radio communication base station exceeds a predetermined number of times; and a step of displaying a fault of the radio communication section on a display section of the portable radio communication terminal when the fault occurs.

According to a third aspect of the present invention, there is provided a fault monitoring program to cause a computer to carry out a fault monitoring method of a commodity management radio communicating apparatus in which plural portable radio communication terminals in a commodity management system manage commodities by communicating with an inventory controller via a radio communication base station, the fault monitoring program including:

a step of automatically executing a test of a radio communication section in the portable radio communication terminal when a number of retrying times of radio communication between the portable radio communication terminal and the radio communication base station exceeds a predetermined number of times; and a step of displaying a fault of the radio communication section on a display section of the portable radio communication terminal when the fault occurs.

With the above configuration, when the number of retrying times in radio communication with the radio communication base station exceeds a predetermined number of times, the portable radio communication terminal executes a test of the radio communication section automatically and judges fault occurrence in the radio communication section. Also, the portable radio communication terminal displays fault occurrence on the display section when the fault occurs. Therefore, radio communication testing by a maintenance person becomes unnecessary when the fault occurs in the portable radio communication terminal, and it is unnecessary for a user of the portable radio communication terminal to execute the radio communication test or to pay attention to the radio communication test.

BRIEF DESCRIPTION OF THE DRAWINGS

The above and other objects, advantages, and features of the present invention will be more apparent from the following description taken in conjunction with the accompanying drawings in which.

DETAILED DESCRIPTION OF THE PREFERRED EMBODIMENTS

Best modes for carrying out the present invention will be described in further detail using an embodiment with reference to the accompanying drawings.

Figure 1:
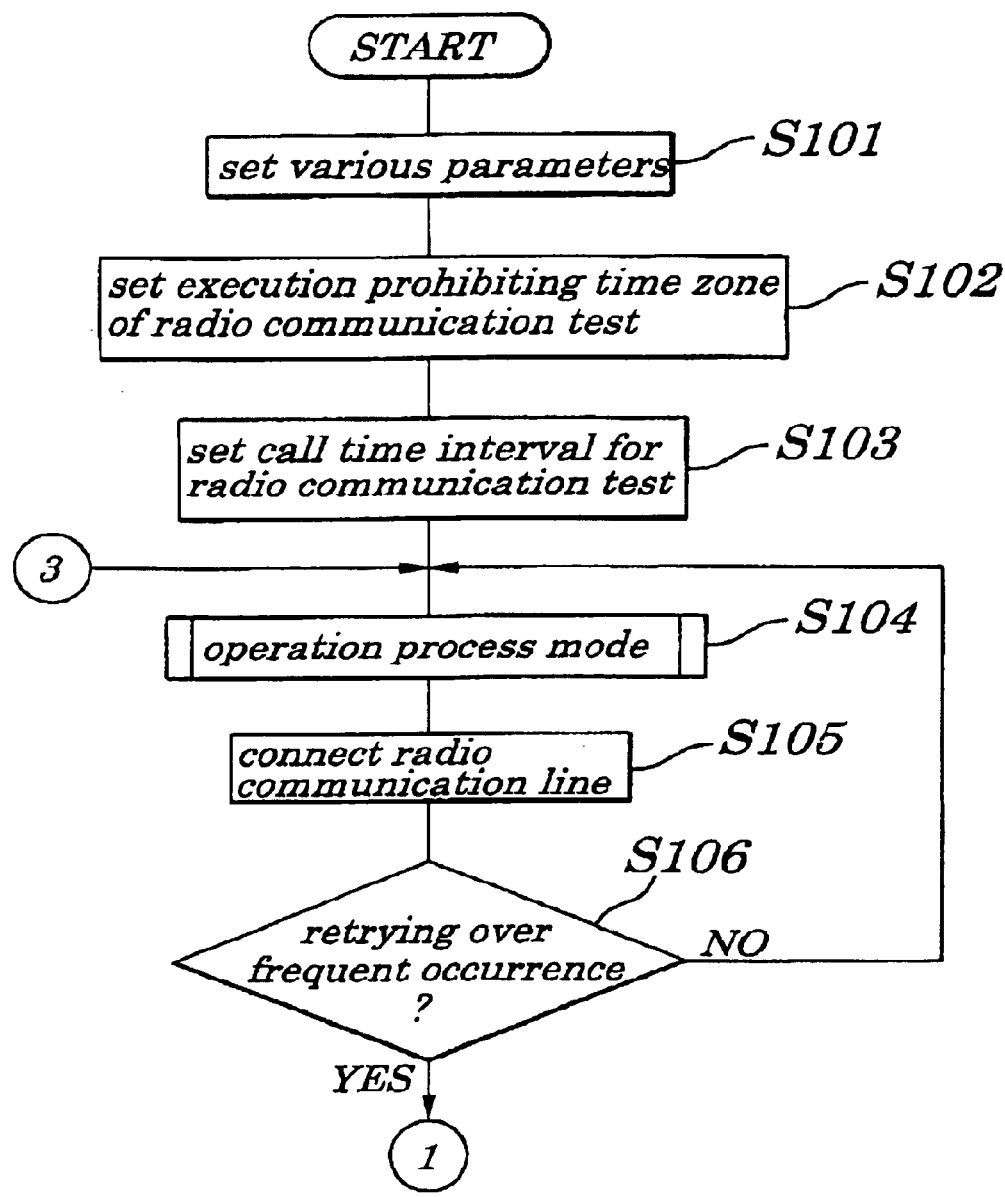
FIG. 1 is a flowchart showing a fault monitoring method for a portable radio communication terminal according to an embodiment of the present invention.
Figure 2:
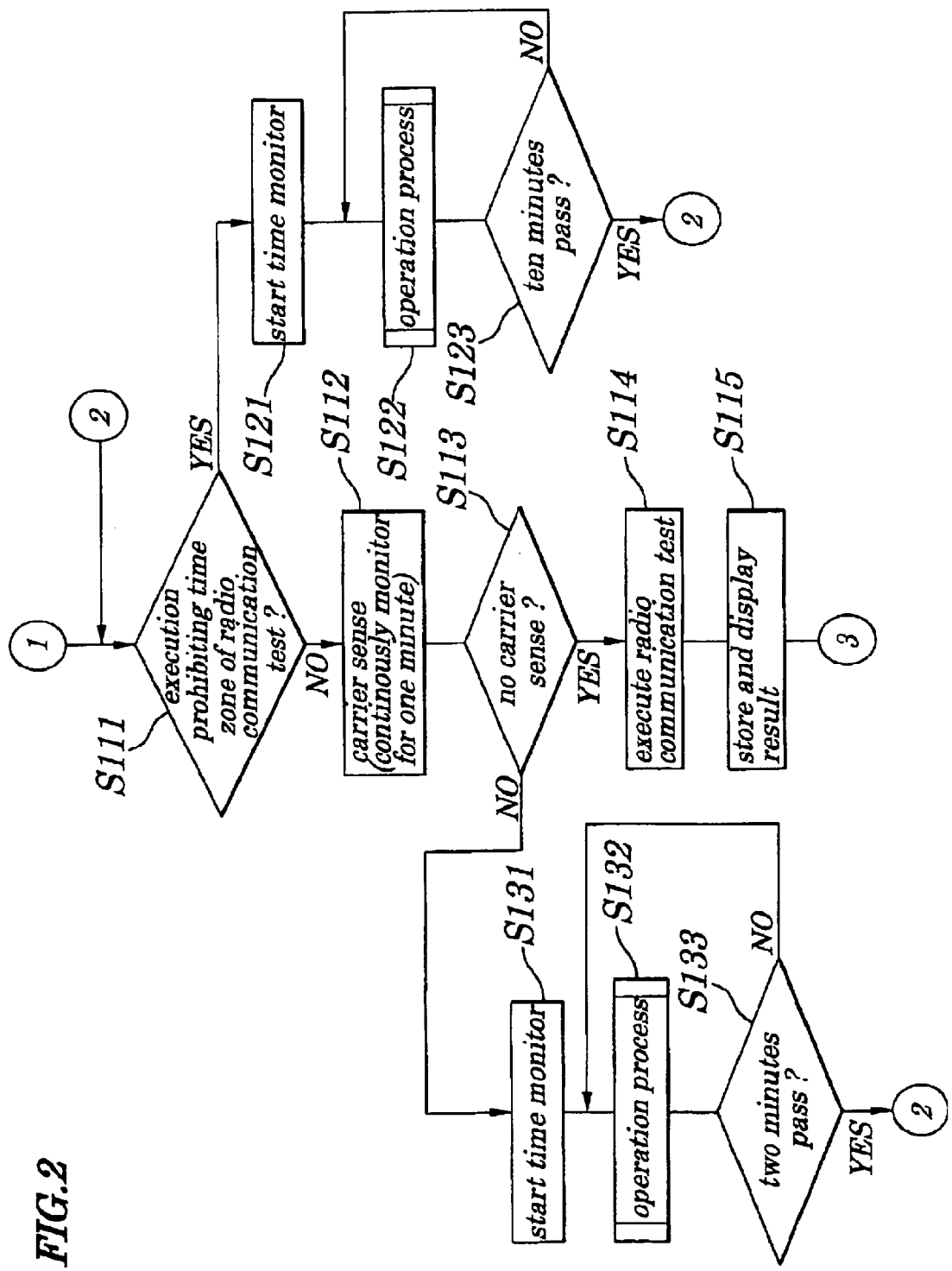
FIG. 2 is another flowchart showing the fault monitoring method for the portable radio communication terminal according to the embodiment of the present invention.
Figure 3:
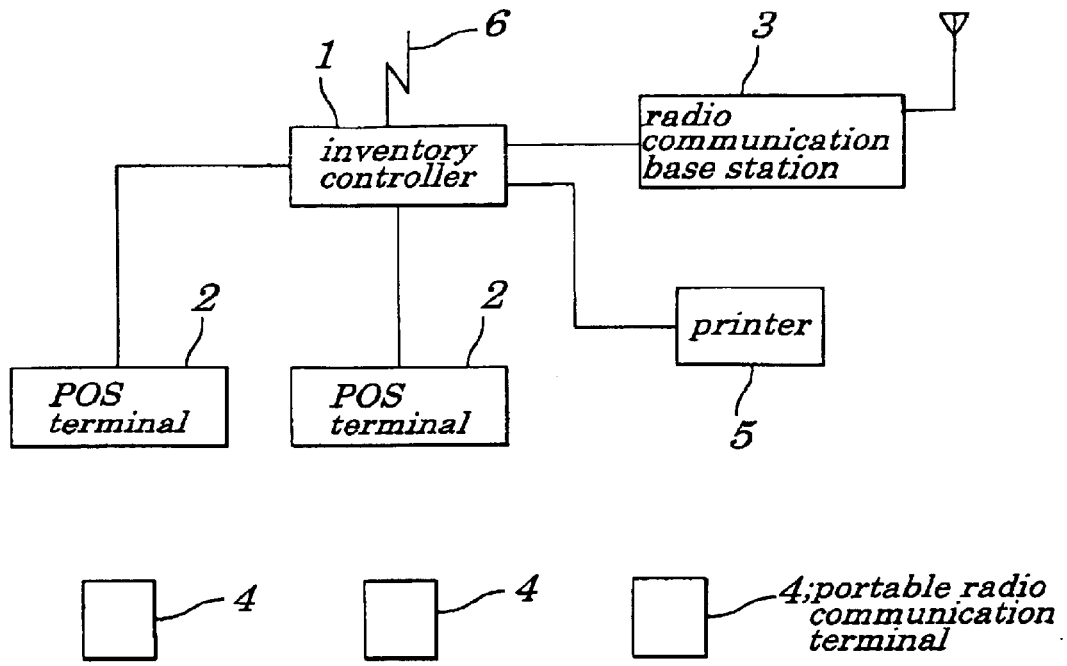
FIG. 3 is a block diagram showing a general configuration of a commodity management system in prior art.
Figure 4:
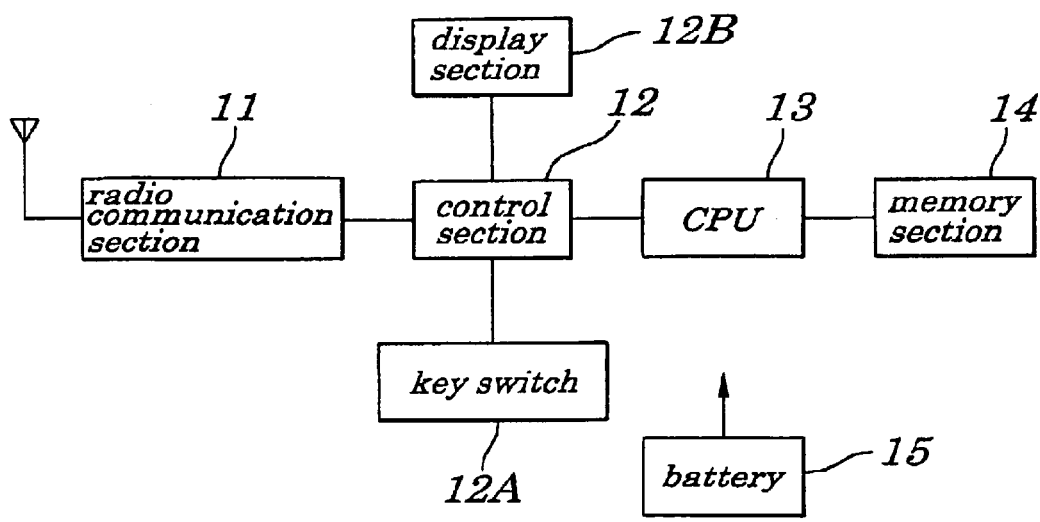
FIG. 4 is a block diagram showing a general configuration of a portable radio communication terminal in prior art.

FIG. 1 and FIG. 2 are flowcharts showing a fault monitoring method for a commodity management radio communicating apparatus according to the embodiment of the present invention. Since a configuration of the portable radio communication terminal to which the present invention is applied is similar to that shown in FIG. 4 and a configuration of a commodity management radio communicating system with which the portable radio communication terminal communicates is similar to that shown in FIG. 3, detailed explanations thereof will be omitted hereinafter.

Explanations will be given of the fault monitoring method of the commodity management radio communicating apparatus with reference to FIG. 1 and FIG. 2.

When an operation of the commodity management system is started, first, various parameters necessary for the operation are set (step S101). In this case, as examples of the parameters to be set, there are a date, an identity number of a monitoring person and a like.

A radio communication test executed when any trouble happens in the portable radio communication terminal is set so as to automatically start in the operation. However, when the radio communication test is started unconditionally, there is a possibility in that an interception is given to another portable radio communication terminal, therefore, the radio communication test can be started when a specific condition is satisfied.

In other words, when there is a time zone in which it is not preferable to automatically start the radio communication test, for example, a busy time zone, the time zone is previously set as "execution prohibiting time zone" (step S102). When it is unnecessary to set the execution prohibiting time zone, "9999" is input.

Then, a call time interval for retrying the radio communication test is set (set S103). The call time interval is set to more than an average communication time (for example, five seconds) of a radio communication between each portable radio communication terminal and the communication base station. In this case, the call time interval is set to six seconds. With this setting, there is no possibility in that a radio communication of the portable radio communication terminal is intercepted continuously.

The various parameters, the execution prohibiting time zone and the call time interval are read from those stored in a nonvolatile memory in a memory section 14 (FIG. 4), therefore, by setting these firstly once, it is unnecessary to set these whenever the radio communication test is executed.

When the setting of the radio communication test is finished, such process becomes automatic in an operation process mode (step S104), a radio communication line connecting process and a like are executed (step S105) and then the portable radio communication terminal becomes in a state of being capable of communicating with the radio communication station.

In the operation, when a retransmission operation (retrying) occurs in the portable radio communication terminal during radio communication with the radio communication base station due to no reply, a fault or an abnormal operation, it is judged whether a "retrying over frequent occurrence" or not by judging whether retrying occurs more than a predetermined number of times or not, for example, more than ten seconds (step S106).

When it is judged as the retrying over frequent occurrence, it is judged whether a current time is in the execution prohibiting time zone of the radio communication test or not (step S111) (FIG. 2). When the current time is in the execution prohibiting time zone, a carrier sense is executed in order to check whether another radio communication is executed or not (step S112) and it is monitored for one minute whether the radio communication is executed or not. With monitored results, when the carrier is not detected (step S113), namely, when a state is vacant, the radio communication test is executed (step S114). When a hardware fault such as a radio communication section fault is detected as a result of the radio communication test, a fault result is stored in the memory section 14 (FIG. 4) and is displayed with the display section 12B (FIG. 4)(step S115).

When the state is judged as the retrying over frequent occurrence and also when the current time is in the execution prohibiting time zone, a time monitoring is started (step S121) and then the process is returned to operation process (step S122). When ten minutes pass after starting the time monitoring (step S123), process is returned to judgment whether the current time is in the execution prohibiting time zone of the radio communication test (step S111). When ten minutes do not pass after starting the time monitoring, the operation process is continued (step S122).

Then, when the current time is in the execution prohibiting time zone of the radio communication test (step S111), the carrier sense is executed by continuously monitoring for one minute (step S112). When a carrier is detected (step S113), it is judged that another portable radio communication terminal is in radio communication, time monitoring is started (step S131) and then the process is returned to operation process (step S132). When two minutes pass after starting the time monitoring (step S133), the process is returned to the judgment whether the current time is in the execution prohibiting time zone of the radio communication test (step S111). When two minutes do not pass after starting the time monitoring, the operation process is continued (step S132).

As described above, according to the embodiment of the present invention, when retrying of the portable radio communication terminal frequently occurs, it is possible to detect an existence of a fault in the radio communication section by executing the radio communication test automatically. Therefore, when a problem or a like occurs in the portable radio communication terminal, it is unnecessary for a maintenance person to go to a customer and to execute the radio communication test. A control section controls each section based on instructions from a CPU due to application software previously stored in a memory section, and thereby a fault detecting operation in this case is automatically executed.

Also, according to the embodiment of the present invention, the portable radio communication terminal automatically executes the radio communication test during operation when retrying occurs frequently due to an error occurrence in radio communication and displays the result of the radio communication test on the display section, therefore, it is unnecessary for a user to execute the radio communication test and to pay attention to the radio communication test. Therefore, since it is possible to reduce a number of normal portable communication terminals together with abnormal portable communication terminals to be repaired, it is possible to reduce wasteful inspection steps in a repair section and it is possible to reduce a number of alternative portable radio communication terminals in a maintenance section. Therefore, it is possible to restrict wasteful investment.

It is thus apparent that the present invention is not limited to the above embodiments but may be changed and modified without departing from the scope and spirit of the invention.

For example, the number of retrying times for judging retrying frequent occurrence is not limited to ten times, and it may be more or less. Waiting time for judging the execution prohibiting time zone of the radio communication test is not limited to ten minutes, and it may be longer or shorter. The monitoring time for carrier sense except for the execution prohibiting time zone of the radio communication test is not limited to one minute, and it may be longer or shorter. Also, the waiting time for executing the radio communication test out of the execution prohibiting time zone of the radio communication test is not limited to two minutes when the carrier is detected, and it may be shorter or longer.

What is claimed is:

1. A fault monitoring method, comprising the steps of:
providing a plurality of portable radio communication terminals in a commodity management system, each of which manages commodities by communicating with an inventory controller via a radio communication base station;
automatically executing a test of a radio communication section in arbitrary portable radio communication terminal when a number of retrying times of radio communication between the arbitrary portable radio communication terminal and said radio communication base station exceeds a predetermined number of times; and
displaying a fault of said radio communication section on a display section of the arbitrary portable radio communication terminal when said fault occurs and
wherein a call time interval of retrying said radio communication between the arbitrary portable radio communication terminal and said radio communication base station is set longer than an average communication time of said radio communication between each of said portable radio communication terminals and said radio communication base station in said commodity management system.

2. A fault monitoring method of a plurality of portable radio communication terminals used in a commodity management system, each of which manages commodities by communicating with an inventory controller via a radio communication base station, said fault monitoring method comprising:
a step of automatically executing a test of a radio communication section in an arbitrary portable radio communication terminal when a number of retrying times of radio communication between the arbitrary portable radio communication terminal and said radio communication base station exceeds a predetermined number of times; and
a step of displaying a fault of said radio communication section on a display section of the arbitrary portable radio communication terminal when said fault occurs,
wherein a call time interval of retrying said radio communication between the arbitrary portable radio communication terminal and said radio communication base station is set longer than an average communication time of said radio communication between each of said portable radio communication terminals and said radio communication base station in said commodity management system.

3. A fault monitoring method of a plurality of portable radio communication terminals used in a commodity management system, each of which manages commodities by communicating with an inventory controller via a radio communication base station, said fault monitoring method:
a step of automatically executing a test of a radio communication section in an arbitrary portable radio communication terminal when a number of retrying times of radio communication between the arbitrary portable radio communication terminals and said radio communication base station exceeds a predetermined number of times; and
a step of displaying a fault of said radio communication section on a display section of the arbitrary portable radio communication terminal when said fault occurs,
wherein said test for said radio communication section is executed after checking that said radio communication between each of said portable radio communication terminals other than the arbitrary portable radio communication terminal and said radio communication base station is vacant continuously in a case out of an execution prohibiting time zone in said commodity management system.

4. The fault monitoring method of a plurality of portable radio communication terminals used in a commodity management system according to claim 3, wherein said test for said radio communication section is executed after passing a predetermined time by returning to a check of a vacant state in said case out of said execution prohibiting time zone in said commodity management system when said radio communication between each of said portable radio communication terminals other than the arbitrary portable radio communication terminal and said radio communication base station and is waited for until said vacant state.

5. The fault monitoring method of a plurality of portable radio communication terminals used in the commodity management system according to claim 3, wherein said test for said radio communication section is executed after passing a predetermined time by returning to a check of said execution prohibiting time zone of said test in a case in said execution prohibiting time zone in said commodity management system and is waited for until out of said execution prohibiting time zone.

6. The fault monitoring method of a plurality of portable radio communication terminals used in a commodity management system according to claim 4, wherein said test for said radio communication section is executed after passing a predetermined time by returning to a check of said execution prohibiting time zone of said test in a case in said execution prohibiting time zone in said commodity management system and is waited for until out of said execution prohibiting time zone.

7. A storage medium storing a fault monitoring program to cause a computer to carry out a fault monitoring method of a plurality of portable radio communication terminals in a commodity management system, each of which manages commodities by communicating with an inventory controller via a radio communication base station, said fault monitoring method comprising:

a step of automatically executing a test of a radio communication section in an arbitrary portable radio communication terminals when a number of retrying times of radio communication between the arbitrary portable radio communication terminal and said radio communication base station exceeds a predetermined number of times; and a step of displaying a fault of said radio communication section on a display section of the arbitrary portable radio communication terminal when said fault occurs, and wherein a call time interval of retrying said radio communication between the arbitrary portable radio communication terminal and said radio communication base station is set longer than an average communication time of said radio communication between each of said portable radio communication terminals and said radio communication base station in said commodity management system.

8. A fault monitoring program to cause a computer to carry out a fault monitoring method of a plurality of portable radio communication terminals in a commodity management system, each of which manages commodities by communicating with an inventory controller via a radio communication base station, said fault monitoring method comprising:

a step of automatically executing a test of a radio communication section in an arbitrary portable radio communication terminal when a number of retrying times of radio communication between the arbitrary portable radio communication terminal and said radio communication base station exceeds a predetermined number of times; and a step of displaying a fault of said radio communication section on a display section of the arbitrary portable radio communication terminal when said fault occurs, and wherein a call time interval of retrying said radio communication between the arbitrary portable radio communication terminal and said radio communication base station is set longer than an average communication time of said radio communication between each of said portable radio communication terminals and said radio communication base station in said commodity management system.

* * * * *